United States Patent [19]
Gruettner et al.

[11] Patent Number: 5,469,958
[45] Date of Patent: Nov. 28, 1995

[54] CONVEYOR DRIVE SPOCKET

[75] Inventors: David R. Gruettner, Mequon; Robert J. Gladczak, Waukesha, both of Wis.

[73] Assignee: UCC Corporation, New Berlin, Wis.

[21] Appl. No.: 395,643

[22] Filed: Feb. 28, 1995

Related U.S. Application Data

[63] Continuation of Ser. No. 283,893, Aug. 3, 1994, abandoned, which is a continuation of Ser. No. 153,203, Nov. 16, 1993, abandoned.

[51] Int. Cl.$^6$ ............................................. B65G 23/06
[52] U.S. Cl. .................... 198/834; 74/594.1; 74/594.2; 403/355; 474/903
[58] Field of Search ............................ 198/834; 474/902, 474/903; 403/355, 356, 358; 74/594.1, 594.2, 451, 405, DIG. 10

[56] References Cited

U.S. PATENT DOCUMENTS

| | | | |
|---|---|---|---|
| 2,361,131 | 10/1944 | Smith | 198/834 X |
| 2,510,644 | 6/1950 | McCormick | 403/356 X |
| 3,724,285 | 4/1973 | Lapeyre | 198/834 |
| 4,865,183 | 9/1989 | Hodlewsky et al. | 198/834 |
| 5,037,356 | 8/1991 | Gladczak et al. | 474/903 X |
| 5,213,001 | 5/1993 | Gruettner et al. | 403/356 X |

FOREIGN PATENT DOCUMENTS

| | | | |
|---|---|---|---|
| 0341698 | 10/1921 | Germany | 403/355 |

*Primary Examiner*—James R. Bidwell
*Attorney, Agent, or Firm*—Jacobson, Price, Holman & Stern

[57] ABSTRACT

A conveyor sprocket formed of a plastic material is mounted on a keyed drive shaft of circular cross section. Within the hub of the conveyor sprocket, an insert, formed of a relatively harder or more durable material, engages the key. The insert resists deformation and helps increase the torque capacity of the conveyor sprocket. In one embodiment, the keyed shaft includes two diametrically opposed keys and the conveyor sprocket includes two diametrically opposed inserts and engagement therewith. In one embodiment, the key does not project beyond the ends of the conveyor sprocket hub.

15 Claims, 2 Drawing Sheets

FIG. 1
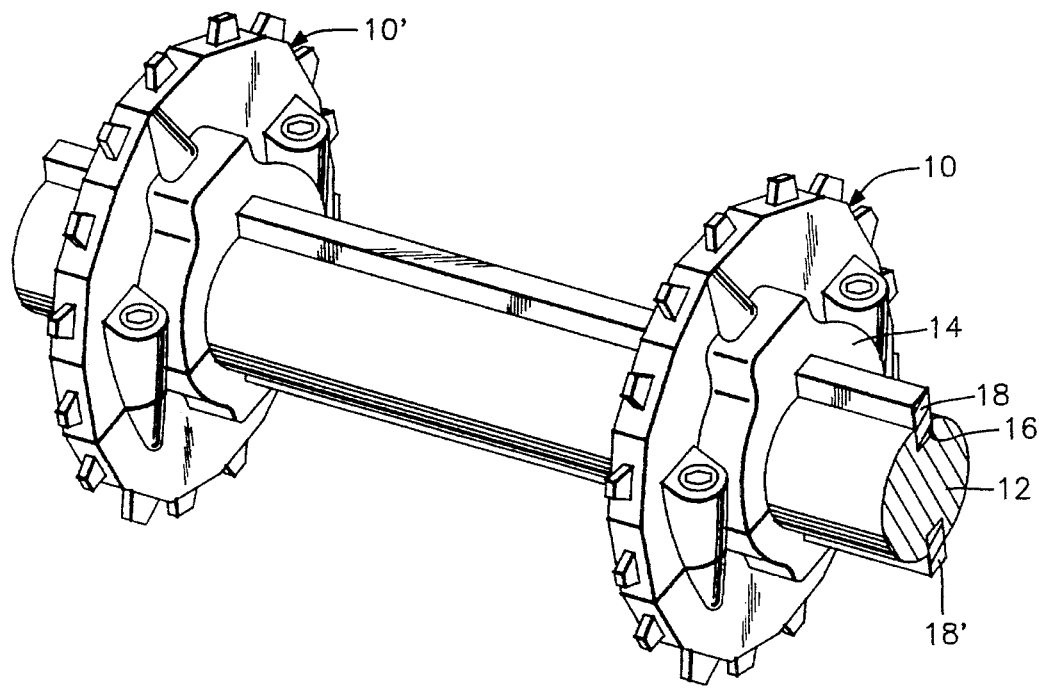
FIG. 3
FIG. 2
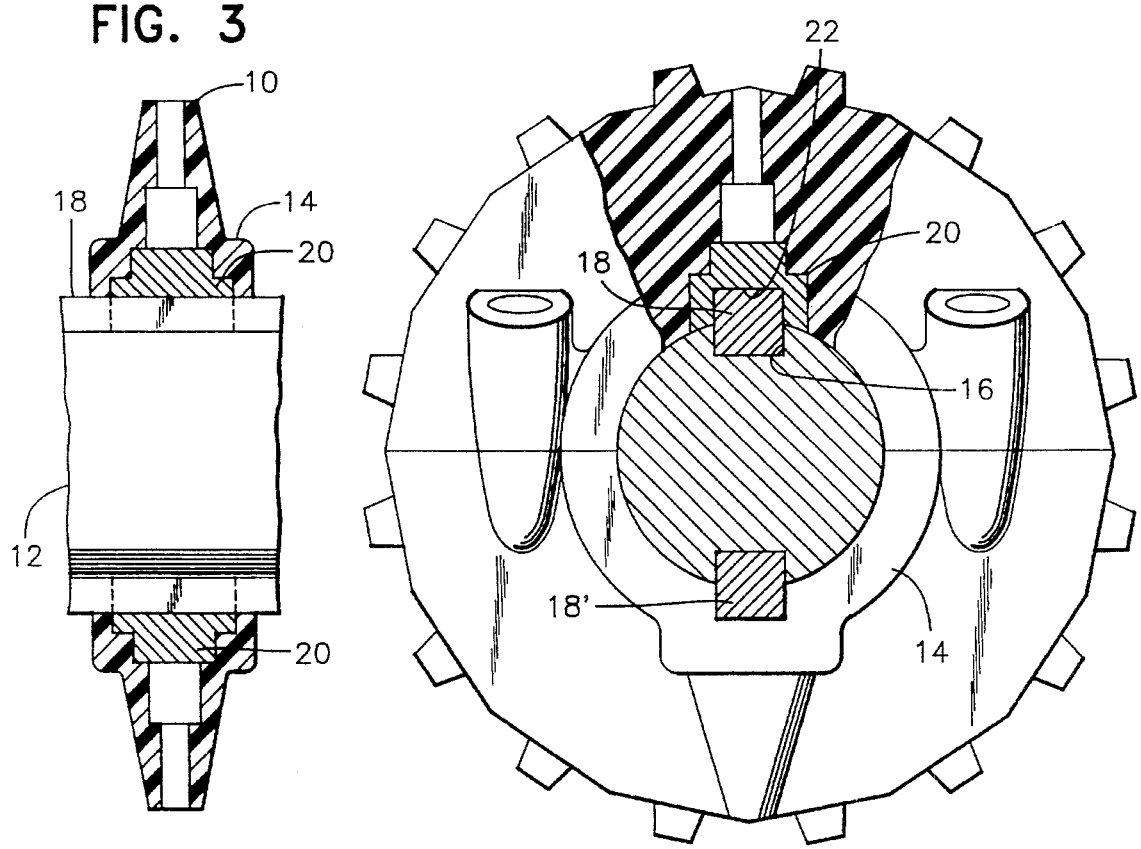

CONVEYOR DRIVE SPOCKET

This is a Continuation of application Ser. No. 08/283,893, filed Aug. 3, 1994 which was abandoned upon the filing hereof; which was a continuation of application Ser. No. 03/153,203, filed Nov. 16, 1993, now abandoned.

BACKGROUND OF THE INVENTION

This invention relates to conveyor drive systems and, more particularly, to conveyor drive sprockets formed of plastic materials.

For a number of reasons, including cost, weight, durability and ease of manufacture, conveyor drive sprockets can advantageously be formed of a variety of plastic materials. One drawback to the use of such materials, however, is that plastics generally have lower shear and torsional strengths than most metals. Material failure at the interface between a conveyor sprocket and a powered drive shaft on which it is mounted is often the limiting factor in defining the maximum drive capacity of the sprocket. The problem of limited plastic strength is particularly acute when conveyor sprockets are required to move axially on a drive shaft as, for example, to accommodate temperature changes. Such sprockets cannot be locked firmly to the drive shaft.

In U.S. Pat. No. 3,724,285 (reissued as Re. No. 30,341) and U.S. Pat. No. 4,865,183, axially movable plastic conveyor sprockets are mounted on drive shafts of substantially square cross section. The relatively large dimensions and the square corners of the driven shafts effectively transfer torque to the conveyor sprockets without concentrating forces and without thereby causing material failure in small areas of the sprockets. Although effective, square drive shafts have certain drawbacks, particularly in such areas as manufacture and mounting for rotation. Such sprockets are not usable with round shafts, which are considerably simpler to manufacture and mount than square shafts.

SUMMARY OF THE INVENTION

The invention provides a conveyor sprocket mountable and axially movable on a keyed drive shaft. The conveyor sprocket includes a central hub formed of a relatively deformable material and further includes a central aperture for receiving therethrough the keyed shaft. The conveyor sprocket further includes an insert formed of a relatively rigid material received within the central hub. The insert engages the key of the keyed shaft to receive the driving forces transmitted through the key and distribute the driving forces to the central hub.

In one embodiment, the keyed shaft includes two diametrically opposed keys and the conveyor sprocket includes two diametrically opposed inserts for engaging the keys of the keyed shaft.

It is an object of the present invention to provide a new and improved conveyor sprocket.

It is a further object of the present invention to provide a new conveyor sprocket that is formed of plastic materials and that is mountable on a keyed drive shaft of substantially circular cross section.

It is a further object of the present invention to provide a conveyor sprocket, formed of a plastic material, that is axially movable on a keyed drive shaft.

BRIEF DESCRIPTION OF THE DRAWING

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a pair of axially movable conveyor drive sprockets mounted on a keyed shaft.

FIG. 2 is a front elevation view, partially in section, of one of the conveyor drive sprockets shown in FIG. 1.

FIG. 3 is a cross-sectional view of the conveyor drive sprocket shown in FIG. 2.

DESCRIPTION OF THE PREFERRED EMBODIMENT

Figure 5:
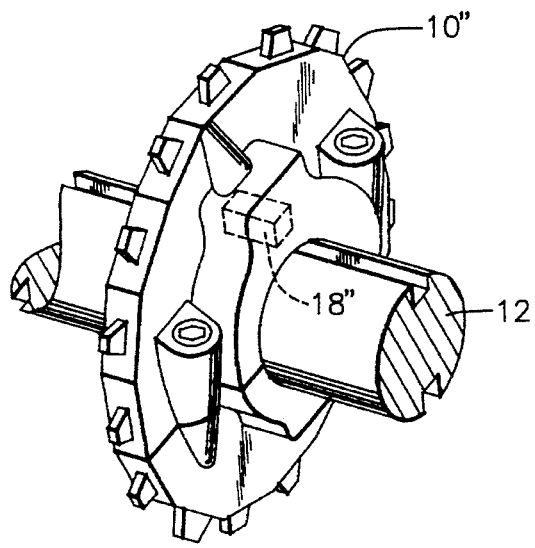
FIG. 5 is a perspective view of an alternate embodiment conveyor drive sprocket mounted on a keyed shaft.
Figure 4:
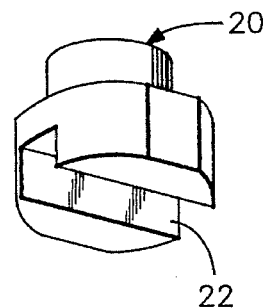
FIG. 4 is a perspective view of an insert incorporated in the conveyor drive sprockets of FIGS. 1–3.

Reference is made to Applicants' U.S. Pat. No. 5,213,001, issued May 25, 1993, the specification of which is incorporated by reference herein.

Referring to the drawings, and in particular to FIGS. 1, 2 and 3, a pair of conveyor drive sprockets 10, 10' are shown mounted on a keyed drive shaft 12. In accordance with one aspect of the invention, each conveyor drive sprocket 10 is axially movable on the drive shaft 12. As illustrated, the sprocket 10 includes a hub portion 14 that engages and encircles the keyed drive shaft 12. In the illustrated embodiment, the shaft 12 includes at least one axially extending keyway 16 and metallic key 18 of substantially rectangular cross-section received therein. Preferably, the sprocket 10 is of split design as shown in U.S. Pat. No. 5,037,356, issued Aug. 6, 1991, the specification of which is incorporated by reference herein.

To simplify manufacture and reduce manufacturing costs, the sprocket 10 is formed of a molded, thermoplastic material. To increase the torque capacity of the sprocket 10, an insert 20 formed of a durable, rigid material is located within the hub 14. Preferably, the insert 20 is formed of a metal such as stainless steel. Alternatively, another rigid material, such as rigid plastic, can be used. The lower surface of the insert includes a longitudinal channel or keyway 22 of substantially rectangular section for receiving the key 18. The sides of the insert 20 are preferably flat to facilitate torque transfer from the insert to the sprocket hub 14. The insert 20 is preferably molded in place when the sprocket 10 is formed.

In use, the insert 20 serves to transfer rotational forces from the keyed drive shaft 12 to the sprocket 10. In the area of the key 18 itself, where substantial forces are developed over a relatively small surface area, metal-to-metal contact is maintained. Because of the relatively larger size of the insert 20, forces developed at the interface between the insert and the sprocket hub 14 are spread over a larger area than is the case in the area of the key 18. By distributing such forces to larger areas of the thermoplastic material, areas of localized stress and possible material deformation are avoided.

In accordance with one aspect of the invention, the hub 14 and the insert 20 are substantially free of any structure that would prevent axial movement of the sprocket 10 relative to the keyed drive shaft 12. In the embodiment shown in FIGS. 1–3, the key 18 extends substantially the full length of the shaft 12. The keyway slots 22 and 16 formed in both the insert 20 and the material of the hub 14 extend fully from one side of the sprocket 10 to the other. This enables the sprocket 10 to slide axially over the entire length of the shaft 12. As shown in FIG. 1, the sprocket 10 can be configured for mounting on a shaft 12 having two diametrically opposed keys 18, 18'. In such a case, the sprocket halves can be identical with each half containing an insert 20. Alternatively, the sprocket 10 can be configured for mounting on a shaft 12 having a single key 18.

Figure 7:
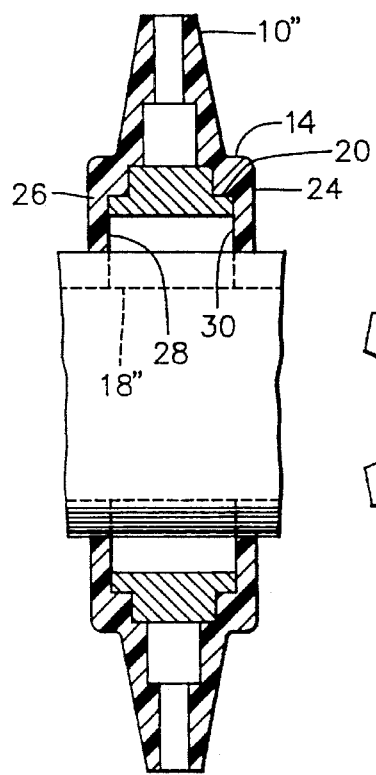
FIG. 7 is a cross-sectional view of the conveyor drive sprocket shown in FIG. 6.
Figure 6:
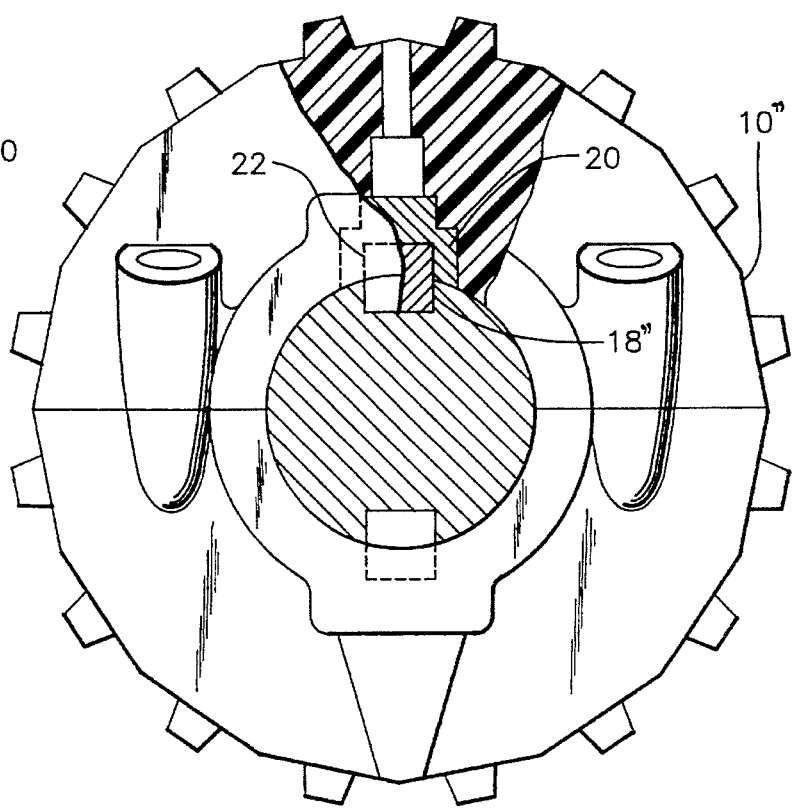
FIG. 6 is a from elevation view, partially in section, of the conveyor drive sprocket shown in FIG. 5.

An alternate embodiment of the invention is shown in FIGS. 5, 6 and 7. In FIG. 5, the sprocket 10", in accordance with another aspect of the invention, is permitted to move axially relative to the keyed shaft 12. To this end, the shaft 12 is provided with a key segment 18" that extends only part way along the axis of the shaft. As best seen in FIG. 7, the hub 14 includes an insert 20 having a keyway for receiving the key segment 18". However, the plastic faces 24, 26 of the sprocket hub 14 are not open or otherwise relieved in the area of the keyway 22 as in the embodiment shown in FIGS. 1–3. Rather, they extend over the keyway 22 thereby defining end walls 28, 30 that engage the ends of the key segment 18". Because the length of the key segment 18" is considerably less than the length of the shaft 12, less keystock material is required. This helps keep costs low. Axial movement of the sprocket relative to the entire length of the shaft 12 is still permitted. The concept can be used in a keyed drive shaft 12 having only a single key segment 18". The concept can also be used in keyed shaft 12' having two diametrically opposed keys.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A conveyor sprocket mountable on and axially movable relative to a substantially cylindrical keyed drive shaft, said conveyor sprocket comprising:

a central hub formed of a molded thermoplastic material and having a central aperture for receiving therethrough the keyed shaft and a key which is longer than the length of the aperture for receiving said key; and an insert formed of a material more rigid than said thermoplastic material and located with said central hub, said insert being positioned and dimensioned to engage the key of the keyed shaft to receive the rotational driving forces transmitted through the key and distribute the driving forces to said central hub when said conveyor sprocket is mounted on the keyed shaft; wherein said conveyor sprocket is laterally unencumbered on the keyed shaft and key to accommodate changes in width of a conveyor belt, by the conveyor sprocket moving along the keyed shaft during operation.

2. The conveyor sprocket as defined in claim 1 wherein said insert includes a keyway shaped and dimensioned to receive therein at least a portion of the key of the keyed shaft, said insert being axially movable along the keyed shaft.

3. The conveyor sprocket as defined in claim 2 wherein said insert further includes at least one side surface for transferring torque from said insert to said conveyor sprocket.

4. The conveyor sprocket as defined in claim 2 wherein said conveyor sprocket includes a pair of substantially planar, substantially parallel flats formed on the outer surface of said insert oriented substantially parallel to the key of the keyed shaft.

5. The conveyor sprocket as defined in claim 1 wherein said conveyor sprocket includes a pair of said inserts diametrically opposed within said central hub.

6. The conveyor sprocket as defined in claim 5 wherein said insert is formed of metal.

7. The conveyor sprocket as defined in claim 1 wherein said insert is formed of metal.

8. The conveyor sprocket as defined in claim 1 wherein said central hub extends over said insert to form end walls at opposite ends of said insert.

9. A plastic conveyor sprocket mountable on and axially movable relative to a keyed drive shaft, said conveyor sprocket comprising:

a central hub formed of plastic having a central aperture for receiving therethrough the keyed shaft and a key which is longer than the length of the aperture for receiving said key; and a metallic insert received within said central hub, said metallic insert being positioned and dimensioned to engage the key of the keyed shaft to receive the rotational driving forces transmitted through the key and distribute the driving forces to said central hub when said conveyor sprocket is mounted on the keyed shaft, said insert being axially movable along the keyed shaft; wherein said conveyor sprocket is laterally unencumbered on the keyed shaft and key to accommodate changes in width of a conveyor belt, by the conveyor sprocket moving along the keyed shaft during operation.

10. The conveyor sprocket as defined in claim 9 wherein said insert includes a keyway shaped and dimensioned to receive therein at least a portion of the key of the keyed shaft.

11. The conveyor sprocket as defined in claim 10 wherein said insert further includes at least one side surface for transferring torque from said insert to said conveyor sprocket.

12. The conveyor sprocket as defined in claim 11 wherein said conveyor sprocket includes a pair of substantially planar, substantially parallel flats formed on the outer surface of said insert oriented substantially parallel to the key of the keyed shaft.

13. The conveyor sprocket as defined in claim 8 wherein said conveyor sprocket includes a pair of said inserts diametrically opposed within said central hub.

14. The conveyor sprocket as defined in claim 9 wherein said central hub extends over said insert to form end walls at opposite ends of said insert.

15. A conveyor sprocket mountable on and axially movable relative to a substantially cylindrical keyed drive shaft, said conveyor sprocket comprising:

a central hub formed of a molded thermoplastic material and having a central aperture for receiving therethrough the Keyed shaft; and an insert formed of a material more rigid than said thermoplastic material and located within said central hub, said insert extending substantially from one side of the central hub to the other and positioned and dimensioned to engage the key of the keyed shaft, said key at least being longer than the length of the insert which receives the rotational driving forces transmitted through the key and distributes the driving forces to said central hub when said conveyor sprocket is mounted on the keyed shaft;

wherein said conveyor sprocket is laterally unencumbered on the keyed shaft and can accommodate changes in width of a conveyor belt, by the conveyor sprocket moving on the keyed shaft during operation.

* * * * *